United States Patent Office 3,007,773
Patented Nov. 7, 1961

3,007,773
ANTICAKING AMMONIUM NITRATE AND
METHOD OF MAKING
Paul O. Marti, Jr., Munster, Ind., assignor to Standard Oil Company, Chicago, Ill., a corporation of Indiana
No Drawing. Filed Dec. 31, 1952, Ser. No. 329,144
12 Claims. (Cl. 23—103)

This invention relates to a particulate ammonium nitrate composition which is substantially non-caking and substantially free-flowing at atmospheric humidity. Also, the invention relates to an improved method of grinding ammonium nitrate in the presence of atmospheric humidity.

Ammonium nitrate is hygroscopic. In the presence of atmospheric humidity particulate ammonium nitrate takes up moisture and the individual particles tend to agglomerate to form lumps; under conditions of high humidity the ammonium nitrate particles tend to form a solid mass. This agglomeration tendency of ammonium nitrate in the presence of atmospheric humidity is commonly called "caking" or "setting."

For most commercial uses it is desirable that the ammonium nitrate particles be free-flowing, e.g., when used as fertilizer. It is necessary that the granules flow readily from the hopper through the distributing slots onto the ground. For use in the explosives industry the powdered ammonium nitrate should flow readily from the storage bins into the mixing vessel. Bagged ammonium nitrate granules tend to cake and this cake must be broken up before use.

Unless considerable care is taken to maintain low atmospheric humidity, it is extremely difficult to obtain powdered ammonium nitrate of a particle size suitable for explosive use. Even with care regarding atmospheric humidity, it is at present a slow and expensive grinding operation to prepare finely powdered ammonium nitrate.

It is an object of this invention to prepare a particulate ammonium nitrate composition that is not susceptible to atmospheric humidity. Another object of the invention is a composition consisting of ammonium nitrate particles coated with a defined articaking-agent. Still another object is a composition consisting of ammonium nitrate particles coated with a comminuted agent, which composition is characterized by essentially free-flowability at atmospheric humidity and by a storage stability substantially that of dynamite grade ammonium nitrate. A particular object of the invention is a method of grinding ammonium nitrate in the presence of atmospheric humidity to produce powdered ammonium nitrate more quickly and more cheaply than by the prior art methods. Another particular object is an improved method of grinding ammonium nitrate in the presence of atmospheric humidity which consists of grinding ammonium nitrate particles in the presence of a defined anticaking-agent.

It has been discovered that ammonium nitrate particles coated with a comminuted agent selected from the class consisting of iron-iron cyanide, cobalt-iron cyanide, copper-iron cyanide and manganese-iron cyanide are essentially non-caking in the presence of atmospheric humidity.

The improved method of grinding ammonium nitrate in the presence of atmospheric humidity grinds ammonium nitrate particles in the presence of an effective amount of said comminuted agent; preferably using an amount at least sufficient to substantially coat the surface of the ammonium nitrate particles produced in the grinding operation.

The term "ammonium nitrate" as used in this specification and in the claims is intended to include either ordinary commercial grade ammonium nitrate or dynamite grade ammonium nitrate or pure ammonium nitrate.

The term "atmospheric humidity" is intended to mean the presence of water vapor in air at various temperatures; or even the atmospheric condition commonly known as fog. More particularly, the term is intended to include those conditions at which the water vapor present in the air would cause agglomeration and caking of ammonium nitrate particles.

The anticaking-agents have the common characteristic of being members of the "iron cyanide complex" class. These agents are selected from the class consisting of iron-iron cyanide, cobalt-iron cyanide, copper-iron cyanide and manganese-iron cyanide. Examples of individual members of the class are ferric ferrocyanide, ferric ferricyanide, ferro ferrocyanide, ferro ferricyanide, cupro ferrocyanide, mangano ferrocyanide and cobalto ferrocyanide.

The term "iron-iron cyanides" is intended to include the complex materials known as the Prussian blues. The Prussian blues are divided into (a) soluble Prussian blue, and (b) insoluble Prussian blue. These Prussian blues contain in addition to the iron and cyanide ions, alkali metal ions and, often, ammonium ions. (None of the commercial insoluble Prussian blues tested were pure ferric ferrocyanide.) The preferred anticaking-agent is insoluble Prussian blue.

The anticaking-agents (grinding aids) of this invention must have a particle size markedly smaller than the particle size of the ammonium nitrate which is to be treated. In order to obtain substantially complete coating a comminuted mixture of the agent is preferred. The commercially available Prussian blues have a particularly good particle size distribution for this purpose. Especially effective agents have a particle size between about 0.01 and about 10 microns; as much as 10 weight percent of particles having an average size somewhat greater than 10 microns may also be present. It is preferred to use agents having a particle size mainly below about 1 micron when the agent is intended for use solely as an anticaking-agent.

The anticaking-agent appears to operate by forming an adherent coating on the outer surface of the ammonium nitrate particle. This coating of agent effectively precludes the water vapor in the atmosphere from contacting the ammonium nitrate. Furthermore, the agent particles reduce the agglomerating tendencies of the ammonium nitrate particles so that the flow characteristics of the particulate coated-ammonium nitrate is better than that of the uncoated particles even in a dry atmosphere. The coating slows, somewhat, the rate of solution of the nitrate in liquid water; however, the solubility in liquid water is not changed.

The iron cyanide complexes of this invention adhere readily to the ammonium nitrate particles. A non-caking composition is easily obtained by simple mixing of ammonium nitrate particles and a suitable amount of the anticaking-agent. More finely divided coated ammonium nitrate particles may be obtained by passing simultaneously ammonium nitrate particles and a suitable amount of anticaking-agent through a grinder. The improved grinding operation can be carried out by first mingling the ammonium nitrate particles and the comminuted anticaking-agent and then grinding the mingled materials; or the ammonium nitrate particles and the anticaking-agent may be added simultaneously as separate streams into the feed chamber of the grinder. When operating with minimum amounts of anticaking-agent (grinding aid), it may be desirable to regrind the product from the first grinding operation.

Some improvement in caking characteristics can be obtained by the addition of minute amounts of iron-iron cyanide. For best results and maximum improvement in caking characteristics at least sufficient agent should be added to the ammonium nitrate particles to substantially coat the entire outer surface of the ammonium nitrate particles. Amounts of agent in excess of this quantity have no significant beneficial effect on the free-flowability of the coated ammonium nitrate particles. The amount of anticaking-agent needed to coat a given quantity of ammonium nitrate particles is dependent upon the size of the ammonium nitrate particles. The smaller the particles the more agent needed per unit weight of ammonium nitrate. For fertilizer size grains as little as 0.1 weight percent, based on ammonium nitrate, of insoluble Prussian blue are sufficient. For the ammonium nitrate particles in so-called dynamite grade, between about 0.3 and 0.5 weight percent of insoluble Prussian blue may be needed. For the fine powder desirable for some explosive usages wherein substantially all the particles pass through a 325 mesh screen as much as 4 or 5 weight percent of insoluble Prussian blue may be needed. In general the amount of anticaking-agent needed to obtain a particulate ammonium nitrate composition characterized by essentially free-flowability at atmospheric humidity is between about 0.1 and 5 weight percent of comminuted anticaking-agent wherein the larger amount corresponds to the finer average particle size of the ammonium nitrate.

The anticaking-agents of this invention catalyze the decomposition of ammonium nitrate. The presence of sufficient ferric ferrocyanide or insoluble Prussian blue in ammonium nitrate can result in an explosion when the ammonium nitrate is heated to about 130° C. The higher the purity of the ammonium nitrate, the more catalyst required. The presence of ferric ferrocyanide or insoluble Prussian blue markedly increases the rate of decomposition, as measured by gas evolution, at higher atmospheric temperatures. However, in general, the amounts of anticaking-agents needed to produce free-flowing ammonium nitrate particles at atmospheric humidity are sufficiently less than the amounts needed to catalyze the decomposition of ammonium nitrate that the coated particles are characterized by storage stability substantially that of dynamite grade ammonium nitrate. Dynamite grade ammonium nitrate contains a sufficient amount of impurities such that the stability is not as great as pure ammonium nitrate; nevertheless, the stability of the dynamite grade is sufficient for all explosive purposes.

In order to illustrate the results obtainable with the anticaking-agents of this invention, the following illustrative examples are set forth:

EXAMPLE I

Run 1 was carried out with Hercules dynamite grade ammonium nitrate. This material was analyzed for particle size distribution using the Rotap screen analysis method. The analysis was carried out at a room temperature of about 70° F. and a relative humidity of about 30%. The analysis showed the following particle size distribution:

| Screen mesh number: | Wt. percent retained |
|---|---|
| +10 | 0.2 |
| +14 | 2.6 |
| +30 | 80.0 |
| +80 | 12.5 |
| −80 | 4.7 |

A quantity of this ammonium nitrate was placed in an 8 ounce screw-top jar. The top was loosely screwed on so that the atmosphere would have access to the interior of the jar. The jar was placed on a shelf in a room; after 7 days' exposure to room temperatures between about 70 and 85° F. and relative humidities of between about 30 and 70%, the ammonium nitrate particles had caked not only together, but had adhered to the glass surface. It was possible to invert the jar without any of the ammonium nitrate particles becoming detached from the mass or the mass becoming detached from the bottom of the jar.

Run 2 was carried out by mixing about 0.5 weight percent of commercial grade insoluble Prussian blue, based on ammonium nitrate, with the same amount of ammonium nitrate particles as used in Run 1. The mixing was accomplished by stirring the insoluble Prussian blue and the ammonium nitrate particles with a spatula.

An electron microscopic examination of the insoluble Prussian blue showed that the particle size ranged from 0.03 to about 3 microns; most of the particles were less than 0.1 micron in size.

Microscopic examination of the mixture showed that the ammonium nitrate particles were completely coated with a layer of insoluble Prussian blue. The individual particles showed the characteristic blue color of the insoluble Prussian blue.

The coated particles were stored in a loosely screw-capped bottle. The particles flowed quite easily and contained no lumps after 5 months' exposure to room temperatures of between 70 and 85° F. and relative humidities between about 20 and 80%.

EXAMPLE II

Run 3

Dynamite grade ammonium nitrate was ground in a Mikro pulverizer at a speed of 9600 r.p.m. using a slotted screen. The first ground material was reground under the same conditions to maximize the finer particles. The Rotap screen analysis of this material was:

| Screen mesh number: | Wt. percent retained |
|---|---|
| +80 | 0.3 |
| +120 | 4.7 |
| +200 | 37.0 |
| +325 | 35.0 |
| −325 | 23.0 |

A quantity of this 9600 r.p.m. material was placed in an 8-ounce glass jar as described in Run 1. After 2 days' exposure to room temperature of about 75° F. and a relative humidity between about 50 and 70%, the material was caked solid and adhered firmly to the glass jar. The jar could be inverted without detaching any of the caked material.

Run 4

About 1 weight percent of insoluble Prussian blue (same as in Run 2) was added to a quantity of the 9600 r.p.m. material. Microscopic examination of the mixture showed the ammonium nitrate particles to be completely coated with a layer of the insoluble Prussian blue. After 5 months' exposure to the same atmospheric conditions as those given in Run 2 the ammonium nitrate containing insoluble Prussian blue was still free-flowing and quite free of lumps.

EXAMPLE III

Run 5

Dynamite grade ammonium nitrate was ground in the Mikro pulverizer at 14,000 r.p.m. The ground material was ground a second time. The room temperature during the grinding was about 75° F. and the relative humidity was about 80%. The ground material tended to "blind" the screen. The total grinding time for 50 grams of ammonium nitrate charged was somewhat more than 1 hour.

The 14,000 r.p.m. material formed lumps in a short time and in about 1 day was caked solid when exposed in a loosely capped jar to a room temperature of about 75° F. and in a relative humidity of about 70%.

The Rotap screen analysis of this 14,000 r.p.m. material—made immediately after grinding—was:

| Screen mesh number: | Wt. percent retained |
|---|---|
| +120 | 68 |
| +200 | 18 |
| +325 | 7 |
| −325 | 7 |

Run 6

Freshly ground 14,000 r.p.m. material was mixed with 2 weight percent of insoluble Prussian blue (same particle size as Run 2) and stored in a loosely capped glass jar. Under the atmospheric conditions of Run 2 this material was after 5 months' exposure free-flowing and quite free of lumps.

EXAMPLE IV

Run 7

Under the same atmospheric conditions as those given in Run 5, 50 grams of dynamite grade ammonium nitrate and 1 gram of insoluble Prussian blue were charged to the Mikro pulverizer operating at 14,000 r.p.m. The ammonium nitrate and the insoluble Prussian blue were commingled by shaking in a jar before being charged to the hopper. The total time for two passes through the pulverizer in this run was less than 3 minutes. The Rotap analysis of the coated ammonium nitrate product from this run was:

| Screen mesh number: | Wt. percent retained |
|---|---|
| +120 | Trace |
| +200 | 4 |
| +325 | 32 |
| −325 | 64 |

This run illustrates the sensational reduction in grinding time obtained by the use of insoluble Prussian blue as a grinding aid and the simultaneous sensational decrease in average particle size of the product ammonium nitrate. It is obvious that a considerable decrease in speed of the Mikro pulverizer can be made when using grinding aid in order to obtain the same particle size distribution as that given in Run 5.

Electron microscopic examination of the product ammonium nitrate particles showed the ammonium nitrate to be completely coated with a layer of insoluble Prussian blue. The coated ammonium nitrate particles showed no evidence of agglomeration after about 5 months' exposure to the conditions of Run 2.

EXAMPLE V

The ammonium nitrate is ground in a controlled humidity room. The temperature in this room is maintained at between about 65 and 85° F. (about the same as the outside atmosphere) and the relative humidity is maintained at between about 30 and 50%. The relative humidity is maintained at these levels because it is generally believed that 55% relative humidity is about the point at which caking occurs at temperatures in the range of about 75 to 80° F. (Experience here shows this belief to be erroneous.)

However, in the absence of a grinding aid considerable difficulty was had in obtaining adequate amounts of ground material owing to "balling up" in the hopper and blinding of the screens. Then the ground material could not be stored, i.e., it had to be used immediately to avoid any caking.

By the use of anticaking-agent, it has been possible to greatly decrease grinding time and to eliminate the grinding of small batches of ammonium nitrate just prior to use. Now, a single large batch is ground periodically, in the presence of about 2 weight percent of anticaking-agent,, and the ground material is stored until needed—thereby effecting a large saving in time and manpower.

EXAMPLE VI

The effectiveness of cupro ferrocyanide as an anticaking-agent and as a grinding aid was tested with dynamite grade ammonium nitrate in the Mikro pulverizer at 14,000 r.p.m.; about 2 weight percent of the agent was added simultaneously with the ammonium nitrate particles to the hopper. The effectiveness of the cupro ferrocyanide as a grinding aid was about that of the insoluble Prussian blue.

The coated 14,000 r.p.m. material was stored in a loosely capped glass jar for determination of the anticaking effectiveness. After 8 weeks of storage at temperatures between about 70 and 80° F. and relative humidity between about 50 and 80%, the coated material was still essentially free-flowing; however, some small lumps had formed. Thus cupro ferrocyanide, at least in the 14,000 r.p.m. material, is not as effective an anticaking-agent as insoluble Prussian blue.

EXAMPLE VII

Several runs were made similar to Example I to determine the effectiveness of the described anticaking-agents, particularly the Prussian blues, with ammonium sulfate, monobasic ammonium phosphate and dibasic ammonium phosphate. These runs indicated that Prussian blue effectively prevents caking of particles of these salts in the presence of atmospheric humidity.

Thus having described the invention, what is claimed is:

1. Ammonium nitrate particles coated with a comminuted agent selected from the class consisting of iron-iron cyanide, cobalt-iron cyanide, copper-iron cyanide and manganese-iron cyanide, which composition is characterized by essentially free-flowability at atmospheric humidity and by a storage stability substantially that of dynamite grade ammonium nitrate.

2. The coated particles of claim 1 wherein said agent is Prussian blue.

3. The coated particles of claim 1 wherein said agent is ferric ferrocyanide.

4. The coated particles of claim 1 wherein said agent is cuproferrocyanide.

5. A particulate composition consisting of ammonium nitrate particles coated with between about 0.1 and 5 weight percent, based on ammonium nitrate, of an iron-iron cyanide, having a particle size between about 0.01 and 10 microns, where the smaller percentage corresponds to larger ammonium nitrate particles, and which composition is characterized by free-flowability at atmospheric humidity and by a storage stability substantially that of dynamite grade ammonium nitrate.

6. The composition of claim 5 wherein said cyanide is insoluble Prussian blue.

7. An improved method of grinding ammonium nitrate in the presence of atmospheric humidity, which method consists of grinding ammonium nitrate particles in the presence of a comminuted agent selected from the class consisting of iron-iron cyanide, cobalt-iron cyanide, copper-iron cyanide and manganese-iron cyanide.

8. The method of claim 7 wherein the particle size of said agent is between about 0.01 and 10 microns.

9. The method of claim 7 wherein said agent is insoluble Prussian blue.

10. The method of claim 7 wherein said cyanide is present in an amount at least sufficient to substantially coat the surface of the product ammonium nitrate particles.

11. An improved method of grinding ammonium nitrate particles in the presence of atmospheric humidity, which method consists of grinding the ammonium nitrate particles in the presence of between about 0.1 and 5 weight percent, based on the nitrate, wherein the larger amount corresponds to the finer average particle size of the ammonium nitrate, of Prussian blue, having a particle size between about 0.01 and 10 microns.

12. A non-caking ammonium nitrate composition which consists of ammonium nitrate particles having a Rotap screen analysis: +14 mesh, about 3 wt. percent; +30 mesh, about 80 wt. percent; +80 mesh, about 12 wt. percent; and −80 mesh, about 5 wt. percent; coated with about 0.3 wt. percent, based on nitrate, of insoluble Prussian blue, having a particle size between about 0.01 and 10 microns.

No references cited.